(12) United States Patent
Lee et al.

(10) Patent No.: US 7,643,114 B2
(45) Date of Patent: Jan. 5, 2010

(54) TRANSFLECTIVE DISPLAY DEVICE WITH REFLECTION PATTERN ON THE COLOR FILTER SUBSTRATE

(75) Inventors: Sun Hwa Lee, Gyeonggi-do (KR); Deuk Su Lee, Gyeonggi-do (KR); Kyo Seop Choo, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 238 days.

(21) Appl. No.: 11/637,265

(22) Filed: Dec. 12, 2006

(65) Prior Publication Data

US 2007/0153173 A1  Jul. 5, 2007

(30) Foreign Application Priority Data

Dec. 27, 2005  (KR)  .................. 10-2005-0130747

(51) Int. Cl.
*G02F 1/1333* (2006.01)
*G02F 1/1335* (2006.01)

(52) U.S. Cl. .................. 349/114; 349/106; 349/113

(58) Field of Classification Search .......... 349/106, 349/114, 113

See application file for complete search history.

(56) References Cited

U.S. PATENT DOCUMENTS

| 2001/0004280 A1* | 6/2001 | Kim et al. | 349/187 |
| 2003/0160918 A1* | 8/2003 | Rho | 349/113 |
| 2005/0018114 A1* | 1/2005 | Park et al. | 349/114 |

* cited by examiner

*Primary Examiner*—David Nelms
*Assistant Examiner*—Jessica M Merlin
(74) *Attorney, Agent, or Firm*—Brinks Hofer Gilson & Lione

(57) ABSTRACT

A transflective liquid crystal display device includes an upper array substrate that has a gate line, a data line crossing the gate line while being insulated, an organic passivation film pattern overlapped with the data line, and a pixel electrode formed to overlap the data line with the organic passivation film pattern therebetween. A lower array substrate faces the upper array substrate with a liquid crystal layer therebetween and that has a dispersion film which disperses an external light, a reflection pattern which is formed on the dispersion film and in a reflection area, a color filter layer formed on the reflection pattern and the dispersion film, and a common electrode which covers the color filter layer. A backlight unit irradiates light to the lower array substrate.

12 Claims, 15 Drawing Sheets

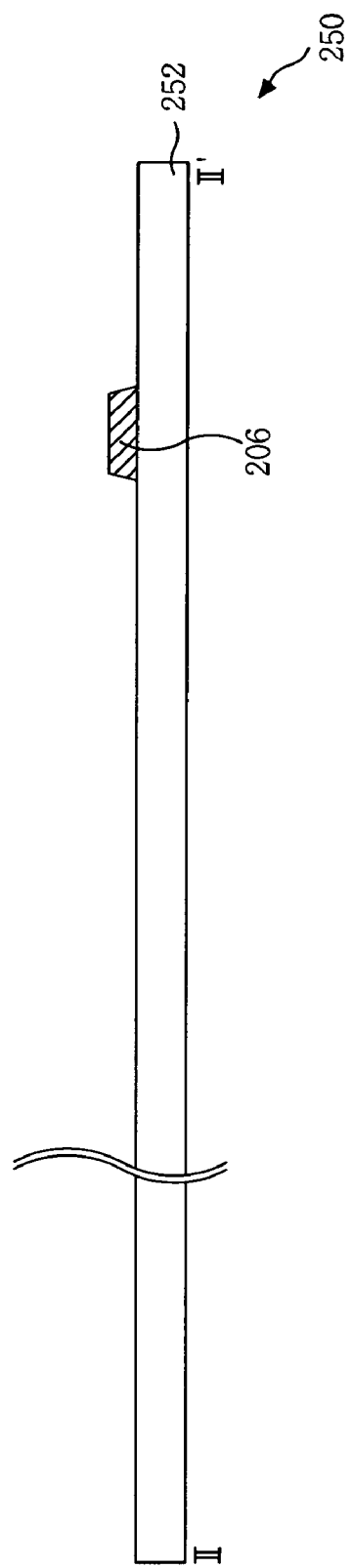

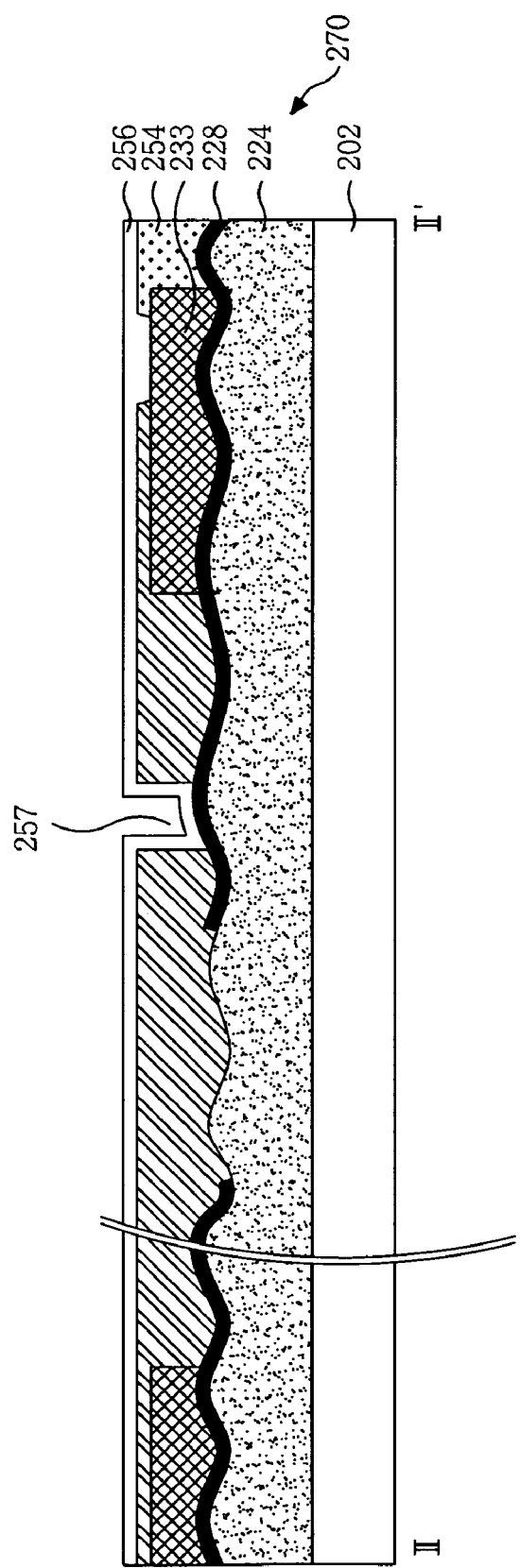

TRANSFLECTIVE DISPLAY DEVICE WITH REFLECTION PATTERN ON THE COLOR FILTER SUBSTRATE

This application claims the benefit of Korean Patent Application No. 10-2005-130747, filed on Dec. 27, 2005, which is hereby incorporated by reference for all purposes as if fully set forth herein.

TECHNICAL FIELD

The present disclosure relates to a transflective liquid crystal display device and a fabricating method thereof. More particularly, a transflective liquid crystal display device is adapted for improving productivity and increasing the aperture ratio of the display device.

DESCRIPTION OF THE RELATED ART

Liquid crystal display devices are normally classified into transmission type, where an image is displayed using the light incident from a backlight unit, and reflection type where an image is displayed by reflecting ambient light like a sunlight or interior room light. Backlight units often use a relatively large power amount of power during operation. The reflection type does not use the backlight unit, thus using less electrical power, but reflection type liquid crystal devices cannot display images in a dark environment due to their dependence on ambient light.

In order to solve the problems associated with both types of liquid crystal display devices, a transflective liquid crystal display device can operate in a transmission mode and a reflection mode. The transflective liquid crystal display device may be operated in the reflection mode if the environment has sufficient brightness for the ambient light to display an image, and the transflective device may be operated in the transmission mode using the backlight unit if there is insufficient background light. Accordingly, it is possible to reduce the power consumption of the device below that used by a transmission type device, with the ability to operate the device in transmission mode in low light situations.

Referring to FIGS. 1 and 2, generally a transflective liquid crystal display device includes an upper array substrate 50 and a lower array substrate 70 which are joined with a liquid crystal layer (not shown) therebetween, and a backlight unit 60 disposed rear side of the lower array substrate 70. Each pixel of the transflective liquid crystal display device is divided into a reflection area having a reflection layer 28 with transparent electrode 32, and a transmission area having transparent electrode 32 only.

The upper array substrate 50 is a color filter (C/F) array substrate. And, the upper array substrate 50 includes a black matrix (not shown) and a color filter layer 54 which are formed on an upper substrate 52, and a common electrode 56 and an alignment film (not shown) which are deposited thereon.

The lower array substrate 70, which is a thin film transistor (TFT) array substrate, includes a gate line 1 and a data line 4 which are formed on a lower substrate 2 to define each pixel area, a thin film transistor connected to the gate line 1 and the data line 4. a pixel electrode 32 which is formed in the pixel area and is connected to a drain electrode 18 of the thin film transistor, and a reflection layer 28 formed in the reflection area of each pixel and overlapped with the pixel electrode 32.

The thin film transistor includes a gate electrode 6 connected to the gate line 1, a source electrode 16 connected to the data line 4, a drain electrode 18 facing with the source electrode 16, an active layer which is overlapped with the gate electrode 6 with a gate insulating film 8 between the active layer and the gate electrode 6 to form a channel between the source and drain electrodes 16, 18, and an ohmic contact layer 12 providing ohmic contact between the active layer 10 and the source-drain electrodes 16, 18. The thin film transistor charges a video signal of the data line 4 and provided on the pixel electrode 32 in response to a scan signal of the gate line 1.

The reflection layer 28 reflects the ambient light to the upper array substrate 50 that is incident through the upper color filter array substrate 50. The surface of an organic film 24 formed under the reflection layer 28 has an embossing shape and the reflection layer 28 thereon also has a similar embossing shape, which increased the reflection efficiency is increased due to a dispersion effect.

The pixel electrode 32 generates a potential difference with the common electrode 56 through a pixel signal that is supplied through the thin film transistor. The liquid crystal with dielectric anisotropy is rotated by the potential difference between the pixel electrode 32 and the common electrode 56 to control the transmittance of the light which passes through the liquid crystal layer of each of the reflection area and the transmission area, thereby changing the brightness in accordance with the video signal.

In this case, a transmission well 36 is formed in an organic film which is relatively thicker in the transmission area so that the length of the light path that passes through the liquid crystal layer is the same in both the reflection area and the transmission area. That is, the path of the reflective light (RL) passing through the liquid crystal layer is 'common electrode 56→liquid crystal layer (of about half thickness)→reflection layer 28→liquid crystal layer (of about half of the thickness pf the liquid crystal layer)→common electrode 56.' On the other hand, the path of the transmission light (TL) passing in through the liquid crystal layer is 'pixel electrode 32→liquid crystal layer (full thickness)→common electrode 56,' As a result, the path length of RL in liquid crystal layer is approximately equal to the path length of TL in liquid crystal layer. Therefore, the transmission efficiency of the reflection mode is approximately identical to the transmission efficiency of the device in the transmission mode.

Further, the lower array substrate 70 additionally includes a first passivation film 22 between the thin film transistor and an organic film 24, a second passivation film 26 between the organic film 24 and a reflection layer 28, and a third passivation film 30 between the reflection layer 28 and a pixel electrode 32. Accordingly, the pixel electrode 32 is connected to the drain electrode 18 through a contact hole 34 which penetrates the first, second, and third passivation films 22, 26, 30, the organic film 24, and the reflection layer 28.

In the transflective liquid crystal display device, the lower array substrate 70 includes a semiconductor process and requires a plurality of mask processes during manufacture. This is disadvantageous because the productivity of the transflective liquid crystal display device deteriorates more than that of the transmission type liquid crystal display device because of the difficult production process of the lower array substrate in the related art transmission type liquid crystal display device.

BRIEF SUMMARY

A transflective liquid crystal display device includes an upper array substrate that has a gate line, a data line that crosses the gate line while being insulated, a thin film transistor formed at the crossing point of the gate line and the data line, an organic passivation film pattern overlapped with the data line and the thin film transistor, and a pixel electrode provided to overlap the data line with the organic passivation film pattern therebetween.

The device additionally includes a lower array substrate that faces the upper array substrate with a liquid crystal layer therebetween. A dispersion film disperses an external light and forms a reflection pattern on the dispersion film and in a reflection area. Further, the device includes a color filter layer formed on the reflection pattern and the dispersion film, a common electrode that covers the color filter layer, and a backlight unit that irradiates light to the lower array substrate.

In the transflective liquid crystal display device, the organic passivation film pattern is formed in the reflection area. The pixel electrode may be connected to the thin film transistor through a contact hole which penetrates the organic passivation film pattern to expose the thin film transistor. The organic passivation film pattern may be formed of an organic insulating material inclusive of acrylic compound, Teflon, BCB, Cytop and PFCB.

A color filter well penetrates the color filter layer formed in the reflection area of the color filter layer. A black matrix may be formed between the color filter layer and the reflection pattern.

A fabricating method of a transflective liquid crystal display device includes providing an upper array substrate that has a gate line, and an insulated data line that crosses the gate line. A thin film transistor is formed at the crossing part of the gate line and the data line. An organic passivation film pattern is overlapped with the data line and the thin film transistor. A pixel electrode is formed to overlap the data line with the organic passivation film pattern therebetween. Additionally, the method includes providing a lower array substrate that has a dispersion film that disperses an external light. A reflection pattern is formed on the dispersion film and in a reflection area. A color filter layer is formed on the reflection pattern and the dispersion film, and a common electrode covers the color filter layer, and the upper array substrate is bonded with the lower array substrate to make them face each other. A liquid crystal is injected between the upper array substrate and the lower array substrate and disposing a backlight unit for irradiating light to the lower array substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 7A to 7D are diagrams showing the steps of forming an upper array substrate fabrication process of the transflective liquid crystal display device according to the second embodiment.

FIGS. 8A to 8E are diagrams showing the steps of forming a lower array substrate fabrication process of the transflective liquid crystal display device according to the second embodiment.

DETAILED DESCRIPTION OF THE PREFERRED EMBODIMENT

Reference will now be made in detail to the preferred embodiments of the present invention, examples of which are illustrated in the accompanying drawings.

Figure 1:
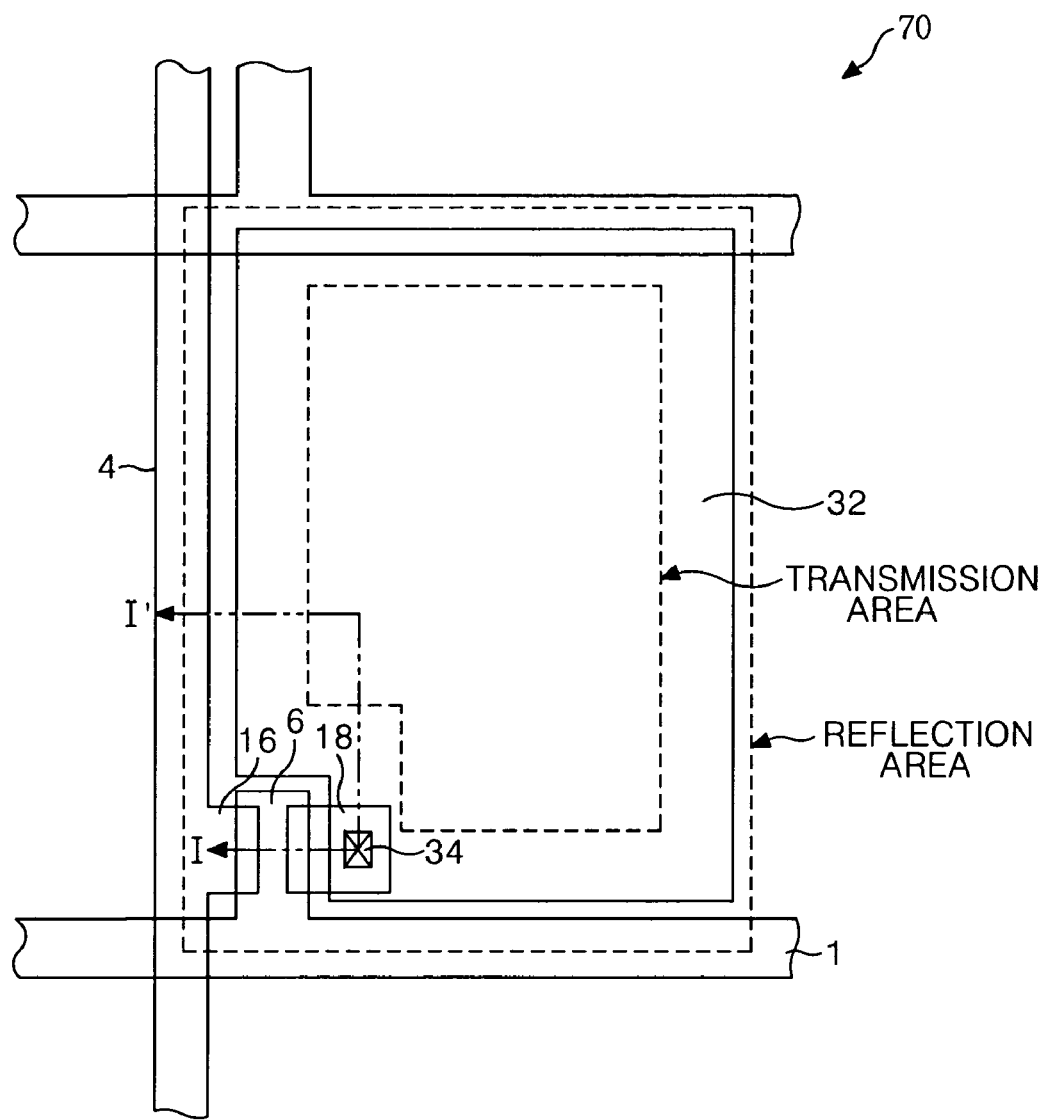
FIG. 1 is a plan view illustrating a lower array substrate of a transflective liquid crystal display device of the related art.
Figure 2:
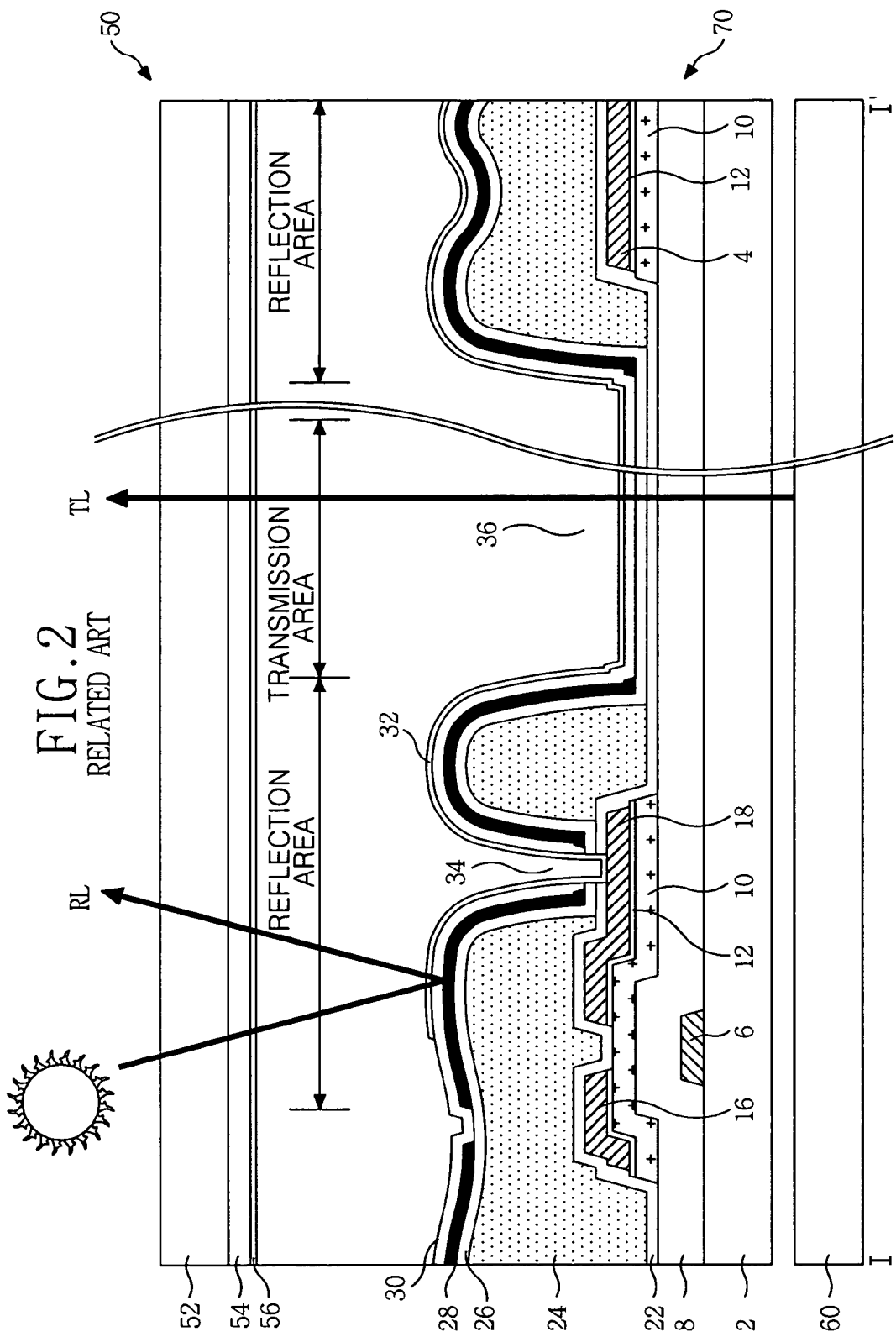
FIG. 2 is a cross sectional view of FIG. 1, illustrating the structure of the lower array substrate and an upper array substrate bonded thereto.
Figure 3:
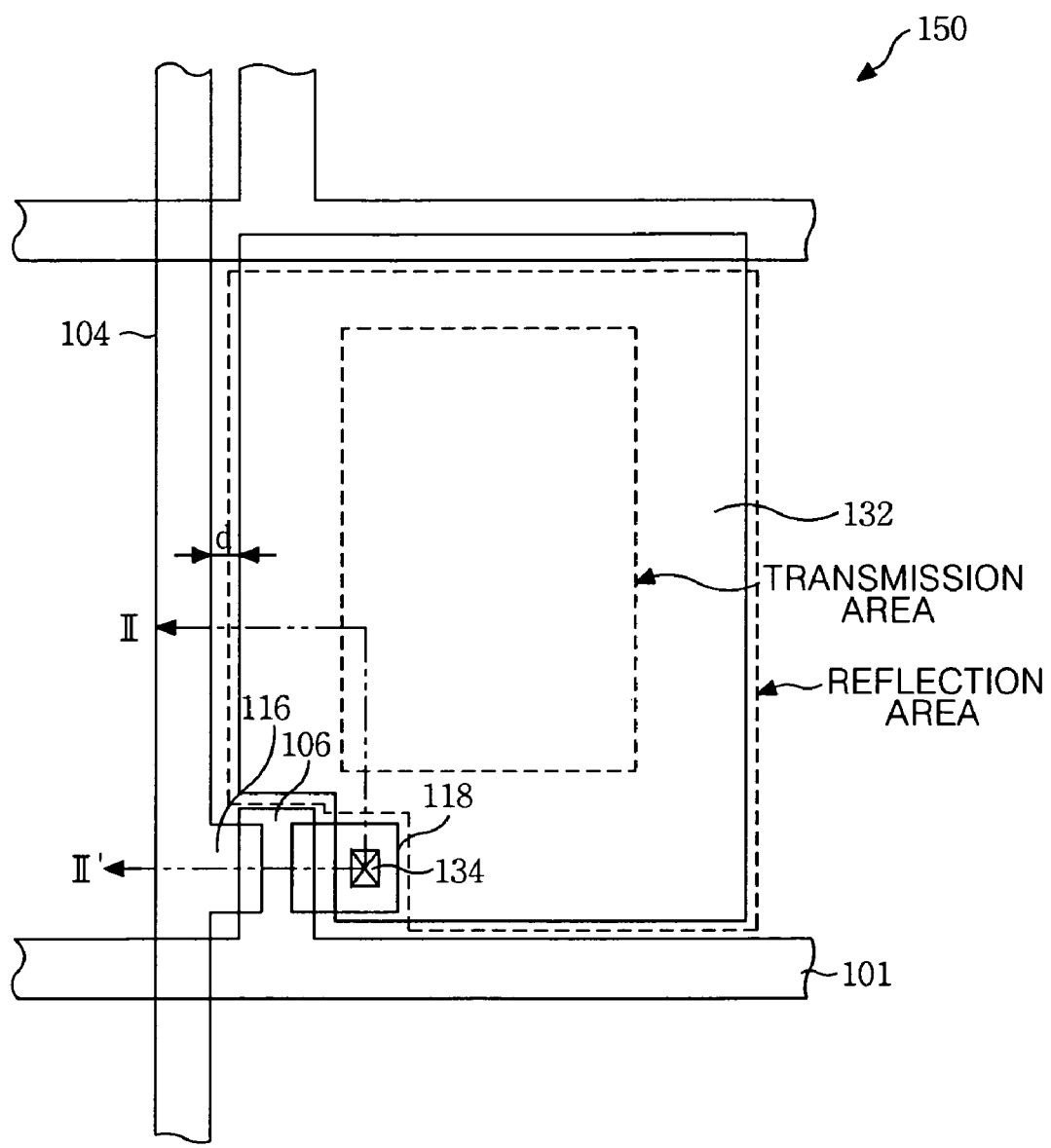
FIG. 3 is a plan view illustrating an upper array substrate of a transflective liquid crystal display device according to a first embodiment of the present invention.
Figure 4:
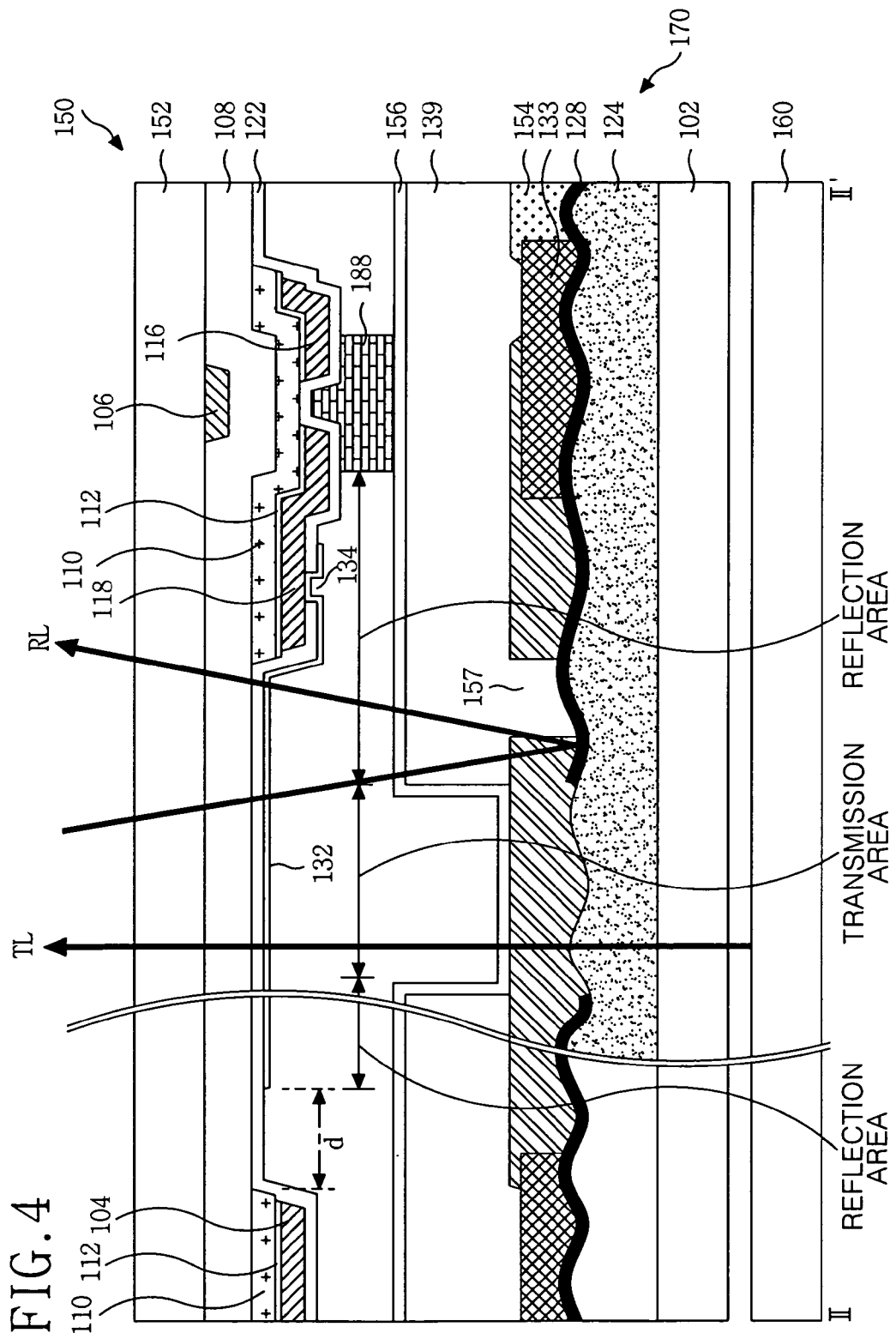
FIG. 4 is a cross sectional view of FIG. 3 along section II-II' illustrating a structure of the upper array substrate and a lower array substrate bonded thereto.

Turning now to FIGS. 3 and 4, a transflective liquid crystal display device according to a first embodiment of the present invention includes an upper array substrate 150 and a lower array substrate 170 which are bonded with a liquid crystal layer (not shown) therebetween, and a backlight unit 160 disposed on a rear side of the lower array substrate 170. Each pixel of the transflective liquid crystal display device is divided into a reflection area having a reflection pattern 128 and a transmission area having no reflection pattern 128.

The upper array substrate 150 is a thin film transistor array substrate, and includes a gate line 101 and a data line 104 which are formed on an upper substrate 152 to define each pixel area, a thin film transistor connected to the gate line 101 and the data line 104, and a pixel electrode 132 which is formed in the pixel area and is connected to the thin film transistor.

The thin film transistor includes a gate electrode 106 connected to the gate line 101, a source electrode 116 connected to the data line 104, a drain electrode 118 facing with the source electrode 116, an active layer 110 that is overlapped with the gate electrode 106 with a gate insulating film 108 therebetween to form a channel between the source and drain electrodes 116, 118, and an ohmic contact layer 112 for making ohmic contact between the active layer 110 and the source and drain electrodes 116, 118. The thin film transistor obtains a video signal from the data line 104 which is transferred to the pixel electrode 132 in response to a scan signal of the gate line 101.

The pixel electrode 132 generates an electric potential difference with the common electrode 156 of the lower array substrate 170 with a pixel signal supplied through the thin film transistor. The liquid crystal has dielectric anisotropy and is rotated by the potential difference to control the transmittance of the light which passes through the liquid crystal layer of each of the reflection area and the transmission area, thereby changing in accordance with the video signal.

The lower array substrate 170 is a color filter array substrate. And, the lower array substrate 170 includes a dispersion film 124, a reflection pattern 128, a black matrix 133, a color filter layer 154, and an overcoat pattern 139 that is overlapped with the reflection pattern 128. The lower array substrate 170 is formed on a lower substrate 102, and a common electrode 156 and an alignment film (not shown) are each deposited thereon.

The dispersion film 124 is formed under the reflection pattern 128 and has an embossing-shaped surface. The reflection pattern 128 thereon also has the embossing shape. The reflection pattern 128 reflects the incident ambient light to the upper array substrate 150. Further, the reflection pattern 128 has the embossing shape as described above, which increases the reflection efficiency due to a dispersion effect.

The color filter layer 154 has red, green and blue color patterns disposed in a striped manner to transmit a light of a specific wavelength range, thereby enabling a color image display. A black matrix 133 is formed between color filter patterns of adjacent colors to absorb the light incident through the adjacent cell, which prevents contrast deterioration. The black matrix 133 is also formed to overlap the reflection pattern 128. In some embodiments, the reflection patter 128 provides the black matrix, which eliminates the need to provide a separate black matrix 133.

Further, a color filter well 157, which removes a portion of the color filter layer 154 at the reflection area may be formed in each of the red, green and blue color filter patterns of the color filter layer 154. The color filter well 157 is formed in the reflection area, thus the length of the light path passing through the color filter layer 154 is identical in the reflection area and the transmission area. Accordingly, the reflective light (RL) realizing an image in case of the reflection mode is passing in the color filter layer along the path of 'color filter layer 154→reflection pattern 128→color filter well 157.' Therefore, the length of the light path in reflection mode is the same length as the length of path of the transmission light (TL) in the transmission mode, which passes through the color filter layer 154 in the transmission area. Therefore, the brightness difference of the colors when the display unit is switched between the reflection and transmission modes can be reduced.

When the overcoat pattern 139 is formed only in the reflection area, it is possible to adjust the length of the light path so that the light path passing through the liquid crystal layer has the same length in the reflection area and in the transmission area. The path of the reflective light (RL) passing through the liquid crystal layer is 'pixel electrode 132→liquid crystal layer (about half of the total thickness)→common electrode 156→overcoat pattern 139→color filter layer 154→reflection pattern 128→color filter well 157→overcoat pattern 139→liquid crystal layer (about half of the total thickness) →pixel electrode 156.' On the other hand, the path of the transmission light (TL) passing in the liquid crystal layer is 'color filter layer 154→common electrode 156→liquid crystal layer (full thickness)→pixel electrode 132.' As a result, the path length of RL in liquid crystal layer is approximately the same path length of TL in liquid crystal layer. Therefore, the transmission efficiency of the reflection mode can be equal to the transmission efficiency of the transmission mode. For example, a proper height of the overcoat pattern 139 is preferably approximately 2 μm, if the cell gap of the transflective liquid crystal display device according to the first embodiment of the present invention is approximately 3.5 μm.

As shown in FIG. 4, a spacer 188 is formed for keeping the cell gap between the upper array substrate 150 and the lower array substrate 170.

The foregoing transflective liquid crystal display device according to the first embodiment of the present invention uses the thin film transistor array substrate, which uses the same lower array substrate of the related art transmission type liquid crystal display device as the upper array substrate. In the related art transmission type liquid crystal display device, the reflection layer is formed in the thin film transistor array substrate. Therefore, the fabrication process is made more difficult and expensive. However, according to the first embodiment of the present invention, the thin film transistor array substrate of the related art transmission type liquid crystal display device is used as the upper substrate, and a relatively simple and inexpensive reflection layer is used as the lower substrate. Hereby, the related art thin film transistor array substrate production process can be used without modification, which improves the productivity of the transflective liquid crystal display device.

In the transflective liquid crystal display device according to the first embodiment of the present invention, the forming area of the pixel electrode 132 is restricted. The reason is that a passivation film 122 is formed of an inorganic insulating material such as SiNx, SiOx, or other similar compounds, in order to protect the thin film transistor and the data line 104. The dielectric constant $\in_0$ of this inorganic insulating material is on the order of 6~7. The passivation film 122 formed of the inorganic insulating material having this dielectric constant is formed between the pixel electrode 132 and the data line 104 to form a parasitic capacitor. If there is a high capacitance of the parasitic capacitor, the pixel electrode 132 and the data line 104 interfere electrically with each other to distort the projected image. Accordingly, in order to prevent the image distortion, the data line 104 and the pixel electrode 132 cannot overlap and should be formed separately from each other with a predetermined distance "d" between them, as shown in FIG. 4. The area of the pixel electrode 132 of the pixel electrode is limited, which reduces the area of the light transmitted through the pixel electrode 132.

Figure 5:
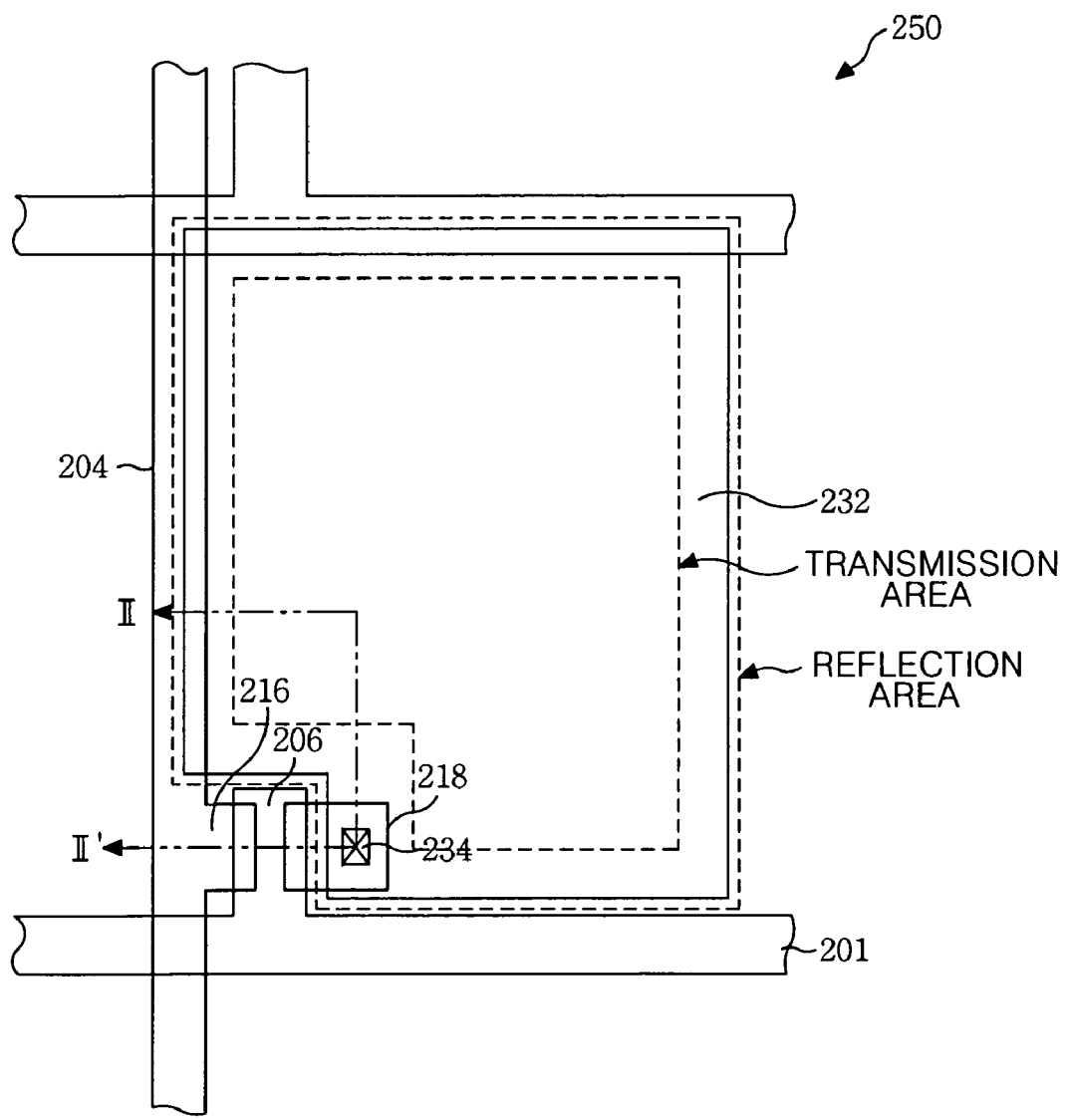
FIG. 5 is a plan view illustrating an upper array substrate of a transflective liquid crystal display device according to a second embodiment of the present invention.
Figure 6:
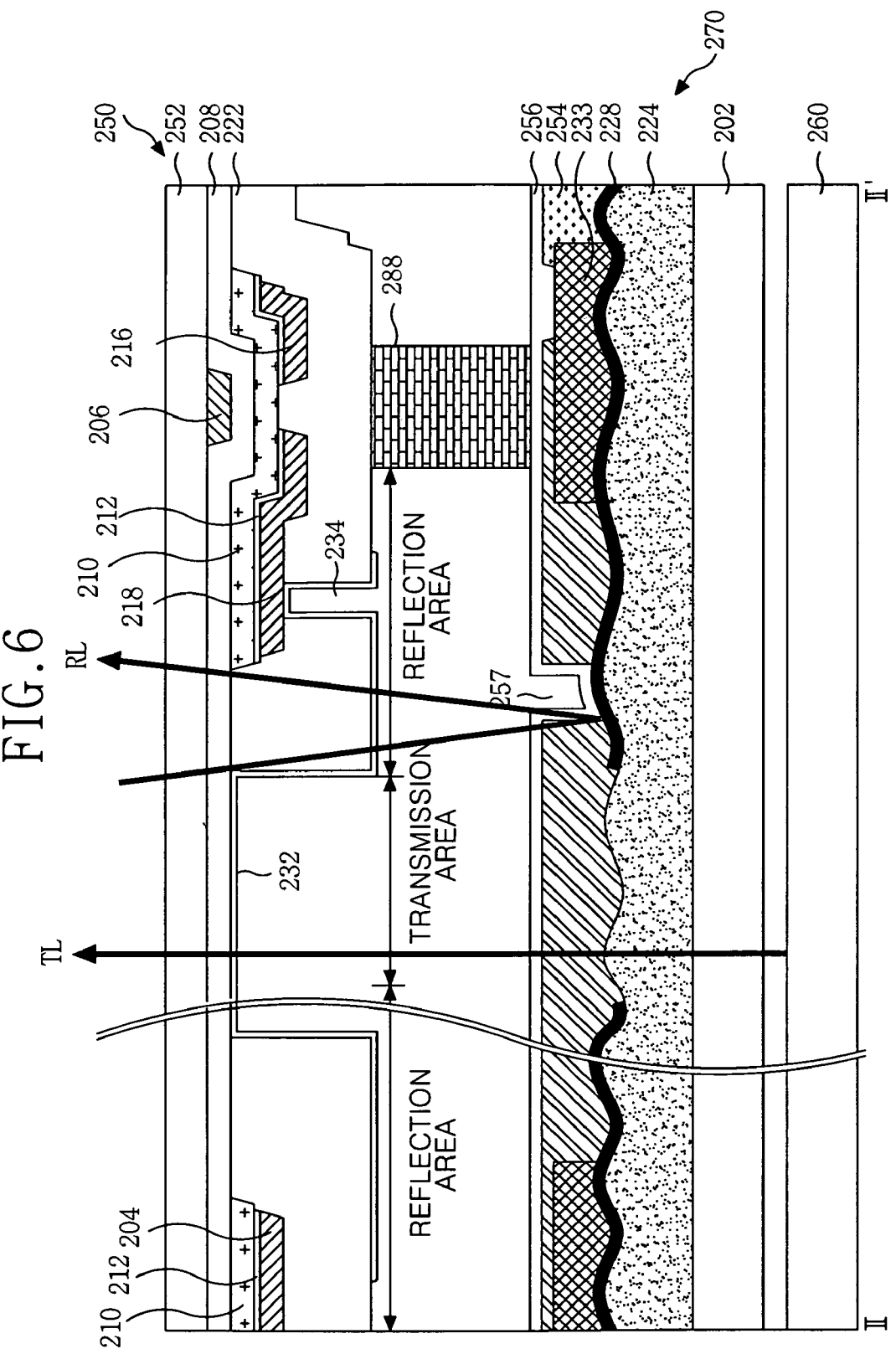
FIG. 6 is a cross sectional view of FIG. 5 along section II-II' illustrating the structure of the upper array substrate and a lower array substrate bonded thereto.

In order to provide a relatively large aperture ratio, a transflective liquid crystal display device according to a second embodiment of the present invention is provided and best shown in FIGS. 5 and 6. A transflective liquid crystal display device according to the second embodiment of the present invention includes an upper array substrate 250 and a lower array substrate 270 that are bonded together with a liquid crystal layer (not shown) therebetween. A backlight unit 260 is disposed at the rear side of the lower array substrate 270. Each pixel of the transflective liquid crystal display device is divided into a reflection area having a reflection pattern 228 and a transmission area without a reflection pattern 228.

The upper array substrate 250, which is formed as a thin film transistor array substrate, includes a gate line 201 and a data line 204 that are formed on an upper substrate 252 to define each pixel area. A thin film transistor is connected to the gate line 201 and the data line 204 and a pixel electrode 232 is formed in the pixel area and connected to the thin film transistor.

The thin film transistor includes a gate electrode 206 connected to the gate line 201, a source electrode 216 connected to the data line 204, a drain electrode 218 facing the source electrode 216, an active layer 210 that is overlapped with the gate electrode 206 with a gate insulating film 208 therebetween to form a channel between the source and drain electrodes 216, 218. An ohmic contact layer 212 makes ohmic contact between the active layer 210 and the source—drain electrodes 216, 218. The thin film transistor makes a video signal of the data line 204 be charged and kept into the pixel electrode 232 in response to a scan signal of the gate line 201.

The pixel electrode 232 generates an electrical potential difference with the common electrode 256 in the lower array substrate 270 due to a pixel signal supplied through the thin film transistor. The liquid crystal is formed with dielectric anisotropy and is rotated by the potential difference to control the transmittance of the light passing through the liquid crystal layer of each of the reflection area and the transmission area, thereby changing the brightness with the video signal.

Further, the upper array substrate 250 further includes an organic passivation film pattern 222 that covers the thin film transistor and the data line 204.

The pixel electrode 232 is connected to the source electrode 218 through a contact hole 234 which penetrates the organic passivation film pattern 222 to expose the source electrode 218.

In the second embodiment, the organic passivation film pattern 222 is formed of an organic insulating material that features a low dielectric constant, such as acrylic compound, Teflon, BCB (benzocyclobutene), Cytop, PFCB (perfluorocyclobutene), or other compounds with similar chemical properties. It is possible to reduce the capacitance of the parasitic capacitor between the data line 204 and the pixel electrode 232 due to the lower dielectric constant than is present in alternate inorganic insulating materials. Because the capacitance of the parasitic capacitor between the pixel electrode 232 and the data line 204 may be reduced, the pixel electrode 232 may be formed to overlap with the data line 204 with the organic passivation film pattern 222 provided therebetween. Accordingly, the pixel electrode 232 area and the aperture ratio are each increased above that possible with the first embodiment, discussed above.

The organic passivation film pattern 222 is formed in the reflection area such that the light path through the liquid crystal layer in the reflection area has substantially the same length as a light path through the liquid crystal layer in the transmission area. The path of the reflective light (RL) passing in the liquid crystal layer is 'organic passivation film pattern 222→pixel electrode 232→liquid crystal layer (about half of the thickness)→common electrode 256→color filter layer 254→reflection pattern 228→color filter well 257→liquid crystal layer (about half of the thickness)→pixel electrode 256→organic passivation film pattern 222.' The transmission light (TL) path through the liquid crystal layer is 'color filter layer 254→common electrode 256→liquid crystal layer (full thickness)→pixel electrode 232.' The path length of RL in the liquid crystal layer is approximately equal to the full thickness of the liquid crystal layer, which is the same path length of transmission light through the liquid crystal layer. Accordingly, the transmission efficiency of the reflection mode becomes equal to the transmission efficiency in the transmission mode.

The lower array substrate 270 is a color filter array substrate. The lower array substrate 270 includes a dispersion film 224, a reflection pattern 228, a black matrix 233, and a color filter layer 254 that each are formed on a lower substrate 202. A common electrode 256 and an alignment film (not shown) are each deposited thereon.

The dispersion film 224 is formed under the reflection pattern 228 and has an embossing-shaped surface, thus the reflection pattern 228 thereon is formed with a similar embossing shape. The reflection pattern 228 reflects the incident ambient light upward to the upper array substrate 250. The reflection efficiency is increased by a dispersion effect due to the embossing shape.

The color filter layer 254 has red, green, and blue color patterns each disposed as stripes to transmit a specific wavelength of light to enable a color display. A black matrix 233 is formed between color filter patterns to absorb incident light through the adjacent cells, thereby preventing contrast deterioration. The black matrix 233 is also formed to overlap the reflection pattern 228. In some embodiments, the reflection pattern 228 substitutes for the black matrix 233.

Further, a color filter well 257 may be formed in each of the red, green and blue color filter patterns by removing a selected portion of the color filter layer 254. The color filter well 257 is formed in the reflection area, thus the length of the light path passing through the color filter layer 254 is identical in the reflection area and the transmission area. Accordingly, the reflective light (RL) realizing an image in the reflection mode passes through the color filter layer 254 along the path of 'color filter layer 254→reflection pattern 228→color filter well 257.' Therefore, the reflective light travels same length as the transmission light (TL) passes through the color filter layer 254 in the transmission area. Therefore, any difference in brightness between the reflection mode and the transmission mode is reduced. A spacer 288 may be formed for maintaining the cell gap between the upper array substrate 250 and the lower array substrate 270.

A fabricating method of the transflective liquid crystal display device according to the second embodiment of the present invention includes an upper array substrate 250 forming process, a lower array substrate 270 forming process, a process of injecting liquid crystal after bonding the upper array substrate 250 and the lower array substrate 270, and a process of disposing the backlight unit 260 behind the lower array substrate 270.

Turning now to FIG. 7A, a gate metal pattern inclusive of the gate electrode 206 is formed on an upper substrate 252 by a photolithography process using a mask and an etching process. A metal within the aluminum group such as Al, AlNd, and other metals with similar properties, may be used to form the gate metal pattern.

Figure 7B:
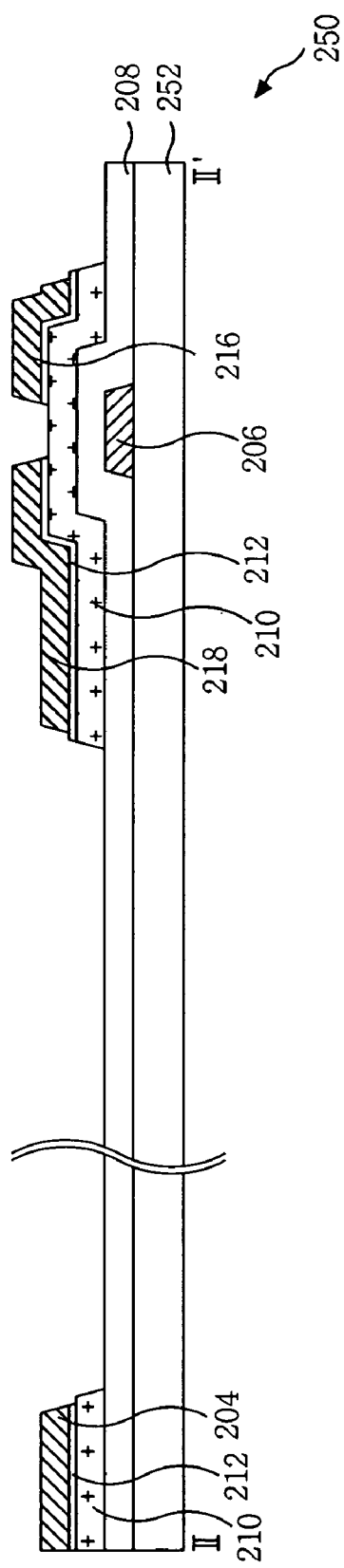

Turning now to FIG. 7B, a gate insulating film 208 is deposited on the upper substrate 252 where the gate metal pattern is formed. A semiconductor pattern includes an active layer 210, an ohmic contact layer 212, a data metal pattern including a data line 204, a source electrode 216, and a drain electrode 218. These layers are formed on the gate insulating film 208 by the photolithography process using the mask and the etching process.

The detailed process of forming the gate insulating film 208, the semiconductor pattern, and the data metal pattern, includes the steps of sequentially depositing and stacking the gate insulating film 208, an amorphous silicon layer, an amorphous silicon layer doped with impurities, and a data metal layer are by a deposition method such as PECVD, sputtering, or other methods known in the art onto the upper substrate 252 where the gate metal pattern is formed. The gate insulating film 208 includes an inorganic insulating material such as silicon oxide SiOx, silicon nitride SiNx, or other similar compounds. The data metal layer may include a metal such as Mo, Cu, Al, Cr, or other metals with similar properties.

After spreading a photo-resist over the entire surface of the data metal layer, the photo-resist is exposed and developed using a photolithography process and a diffractive exposure mask or halftone mask, thereby forming a photo-resist pattern having a stepped difference on the data metal layer.

Subsequently, the data metal layer is patterned by an etching process using the photo-resist pattern which has the stepped difference, thereby forming the data line 204, the source electrode 216, and the drain electrode 218 which are integrated because no channel part is formed. Then, the n+ amorphous silicon layer and the amorphous silicon layer are exposed as the data metal layer is removed by the etching process are sequentially removed by a dry etching. As a result, the semiconductor pattern and the data metal pattern are formed, as shown in FIG. 7B.

Figure 7C:
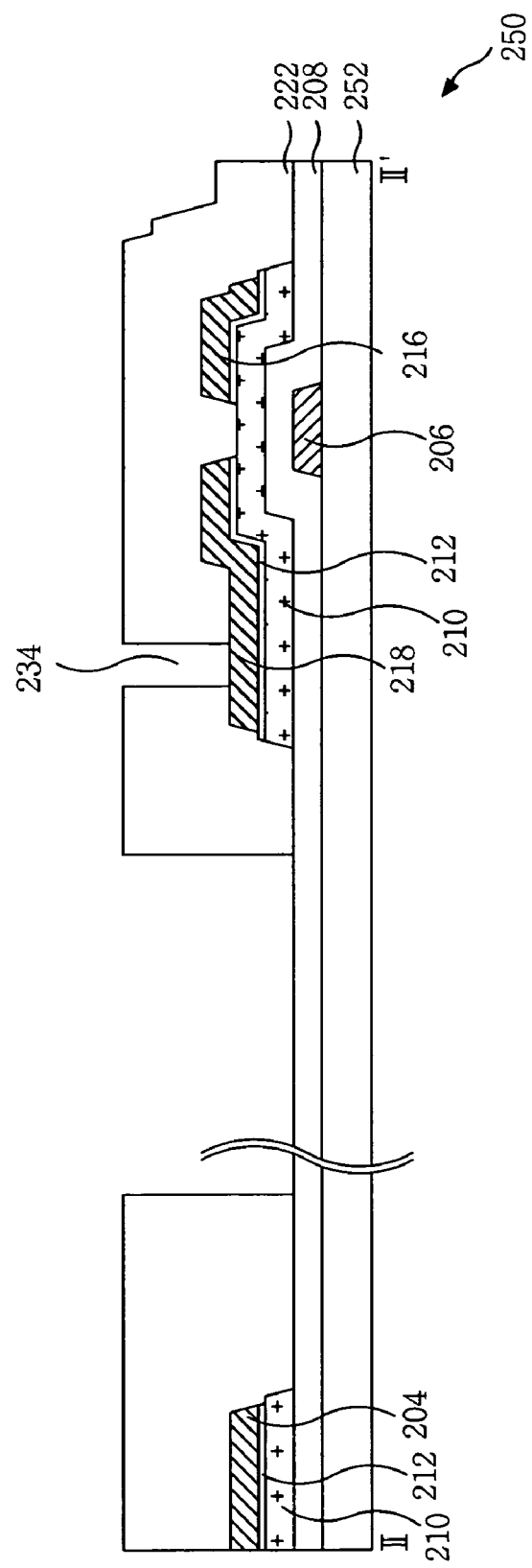

Referring to FIG. 7C, an organic passivation film pattern 222 including a contact hole 234 is formed on the gate insulating film 208 where the semiconductor pattern and the data metal pattern are formed by the photolithography process and the etching process.

To form the organic passivation film pattern 222 including the contact hole 234, an organic insulating layer is initially deposited on the gate insulating film where the semiconductor pattern and the data metal pattern are formed. The organic insulating layer is formed of an organic insulating material, with a low dielectric constant, such as acrylic compound, Teflon, BCB (benzocyclobutene), Cytop, PFCB (perfluorocyclobutene), or another similar compound. The proper height of the deposition thickness of the organic insulating material is preferably approximately 2 μm when the cell gap of the transflective liquid crystal display device is approximately 3.5 μm, in order to make the light path penetrating the liquid crystal layer in the transmission mode to be the same as the light path penetrating the liquid crystal layer in the reflection mode.

After spreading the photo-resist over the entire surface of the organic insulating layer, the photo-resist is then exposed and developed by the photolithography process using the mask, thereby forming the photo-resist pattern. The organic insulating layer is etched with the photo-resist pattern, thus the organic passivation film pattern 222, including the contact hole 234 that exposes the drain electrode 218, is formed in the reflection area.

Figure 7D:
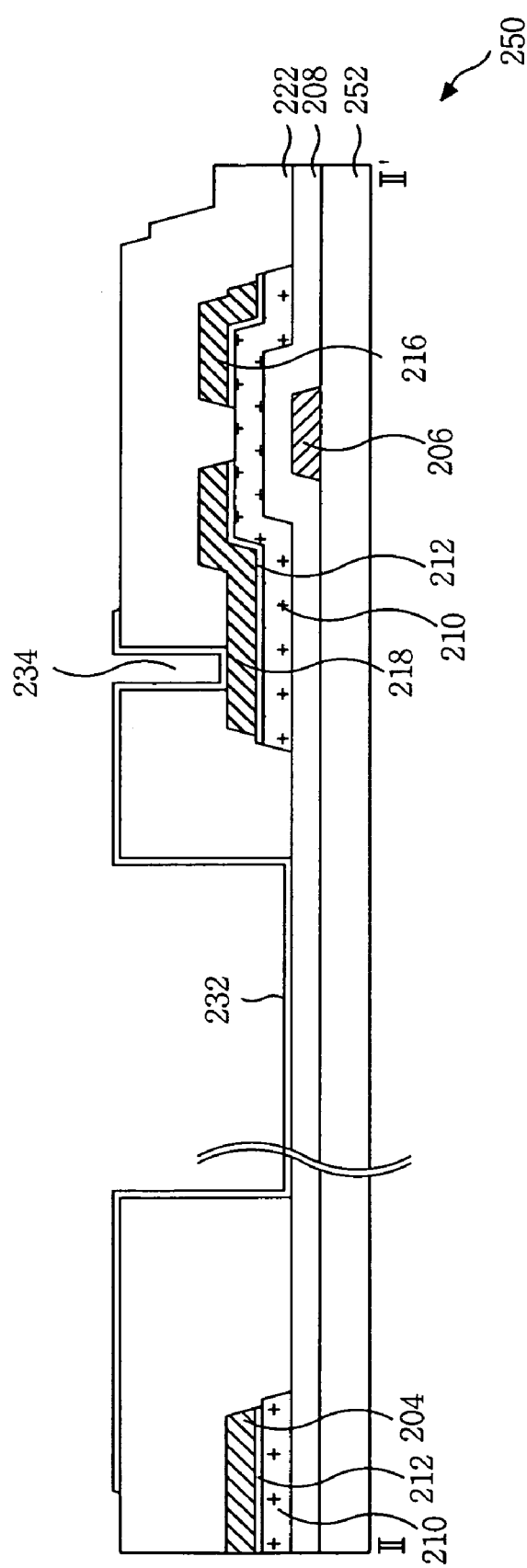

Turning now to FIG. 7D, the pixel electrode 232 is formed on the contact hole 234, the gate insulating film 208 of the transmission area and the organic passivation film pattern 222 are each formed in the reflection area by the photolithography process using a mask and an etching process. The pixel electrode 232 overlaps the data line 204 with the organic passivation film pattern 222.

Figure 8A:
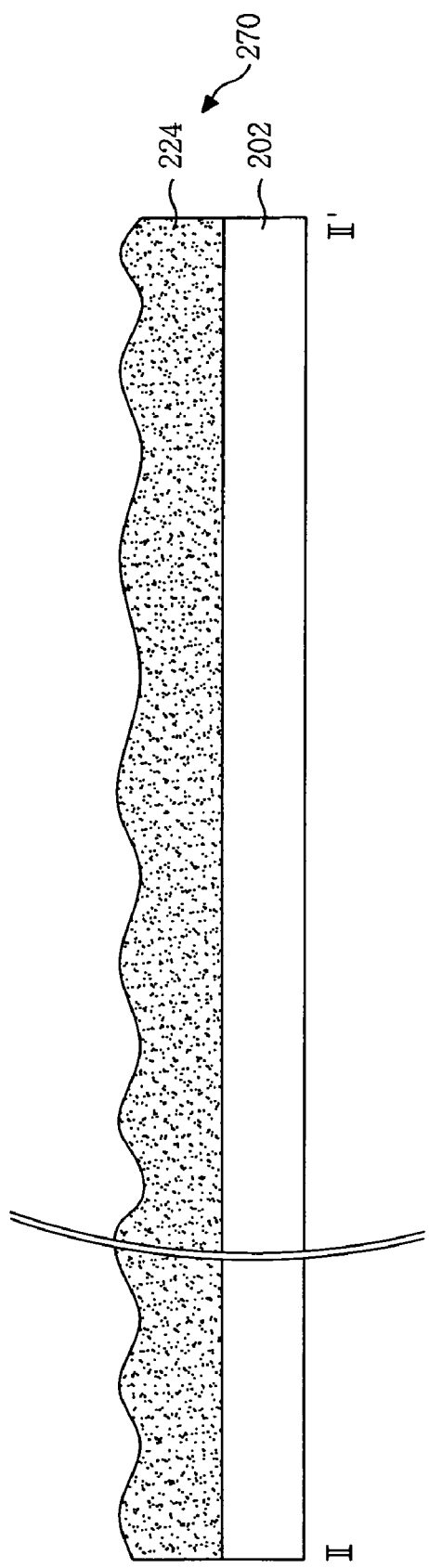

With initial reference to FIG. 8A, the dispersion film 224 is preferably formed on the lower substrate 202. The dispersion film 224 is formed of a photosensitive acryl organic material. The photosensitive organic material is patterned by a photolithography process using a halftone mask or a diffractive exposure mask to form the dispersion film. The mask forming the dispersion film 224 has a structure that repeats the shielding part and the diffractive exposure part (or partial transmission part). The organic material that corresponds with the shielding and diffractive exposure parts is patterned in the structure that the shielding area (projected part) and the diffractive exposure area (groove part) having the stepped difference are repeated. Subsequently, the organic material has an embossing-shaped surface where the projected part and the groove part are repeated.

Figure 8B:
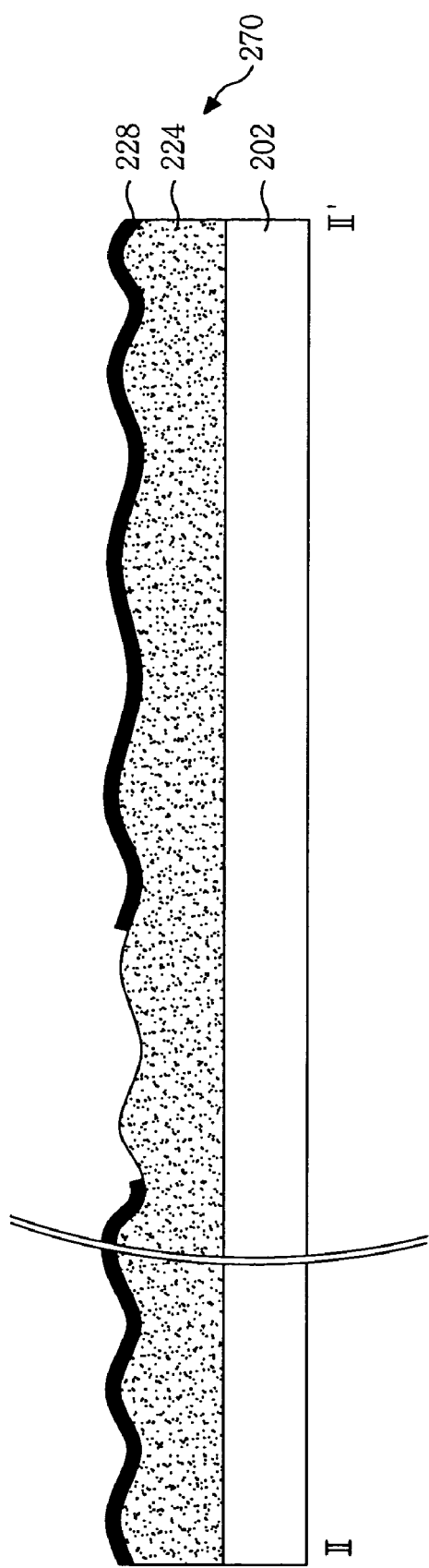

Referring to FIG. 8B, the reflection pattern 228 is formed by the photolithography process using a mask, and the etching process in the reflection area on the dispersion film 224. Specifically, the reflection metal layer is formed on the dispersion film 224 having the embossing surface while maintaining the embossing shape. The reflection metal layer is formed of an aluminum Al group metal such as AlNd that has a high reflexibility. Subsequently, the reflection metal layer is patterned using the photolithography process using the mask and the etching process. Accordingly, the reflection pattern 228 is independently formed for each reflection area of each pixel.

Figure 8C:
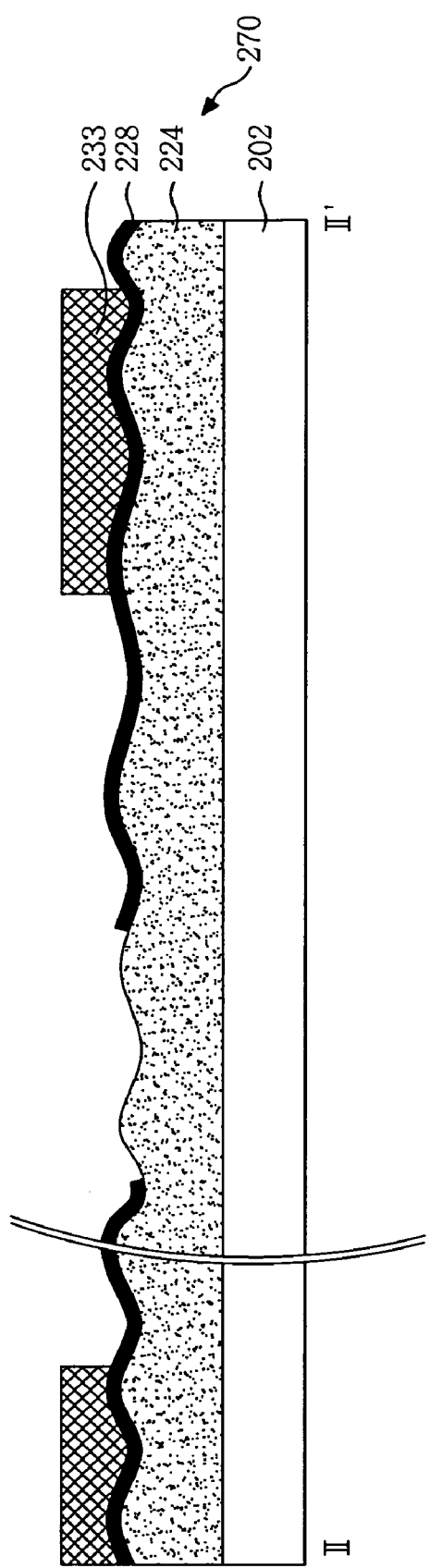

After depositing an opaque resin on the dispersion film 224 with the reflection pattern 228, the opaque resin is patterned by the photolithography process using the mask and the etching process, which forms the black matrix 233, as shown in FIG. 8C.

Figure 8D:
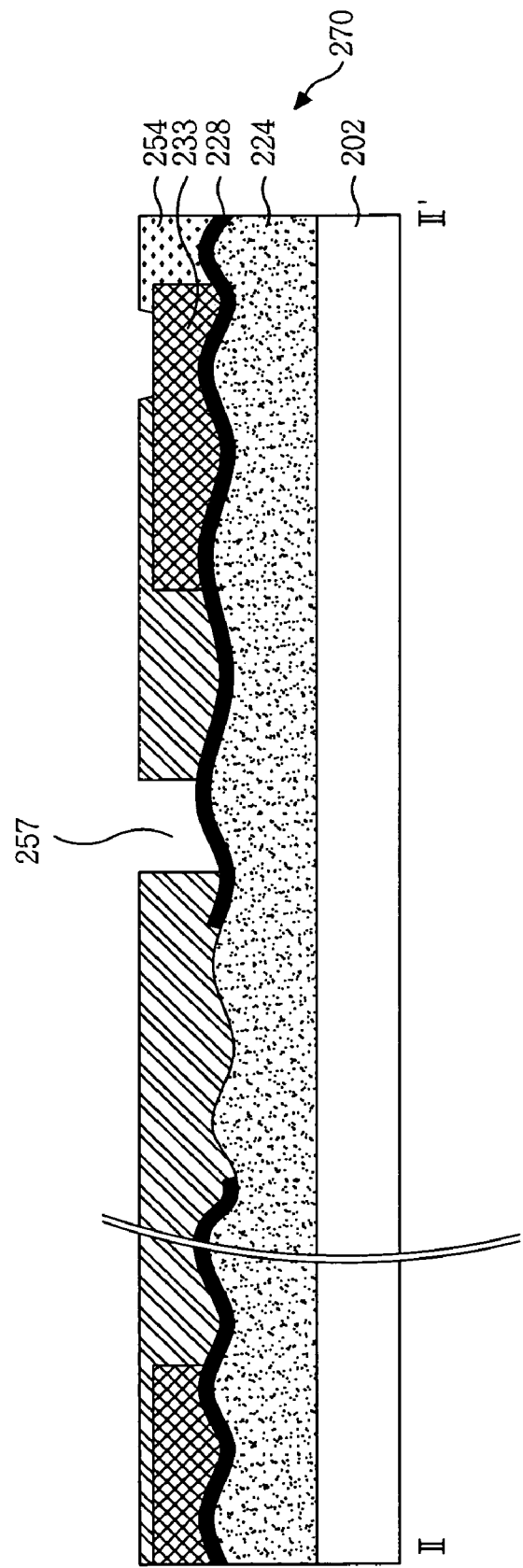

Next, after depositing a red resin on the dispersion film 224 where the black matrix 233 is formed, the red resin is patterned by the photolithography process using the mask and the etching process, to form a red color filter and a red color filter well. After depositing a green resin on the dispersion film 224 where the red color filter is formed, a green resin is patterned by the photolithography process using the mask and the etching process, thereby forming a green color filter and a green color filter well. After depositing a blue resin on the dispersion film 224 where the green color filter is formed, a blue resin is patterned by the photolithography process using the mask and the etching process, thereby forming a blue color filter and a blue color filter well. Hereby, as shown in FIG. 8D, the red, green and blue color filters 254 that include the respective red, green and blue color filter wells 257 are formed.

A transparent conductive material is deposited using a deposition method such as sputtering, (or other methods known in the art) on the dispersion film 224 where the color filter 254 is formed, thereby forming the common electrode 256, as shown in FIG. 8E.

The fabricating method of the transflective liquid crystal display device is similar to the fabrication process of the lower array substrate of the related art transmission type liquid crystal display device, other than the step of forming the organic insulating pattern 222. Therefore, it is possible to improve the productivity of forming the transflective liquid crystal display device.

Further, the fabricating method of the transflective liquid crystal display device according to the second embodiment of the present invention forms the relatively thick organic insulating pattern 222 instead of the passivation film in the upper array substrate 250 to eliminate the step of applying the overcoat pattern 139 to the lower array substrate 170.

The transflective liquid crystal display device and the fabricating method thereof, especially, the fabricating method of the upper array substrate, includes the fabrication process of the lower array substrate of the related art transmission type liquid crystal display device. This improves the productivity of the transflective liquid crystal display device.

The transflective liquid crystal display device and the fabricating method include a structure that the overcoat pattern of the lower array substrate can be removed by forming the thick organic insulating pattern instead of the passivation film in the upper array substrate. The removal of the lower array substrate simplifies the fabrication process of the lower array substrate.

The transflective liquid crystal display device and the fabricating method thereof according to the present invention forms the organic insulating pattern, therefore is possible to widely form the area of the pixel electrode of the upper array substrate. With reference to FIGS. 3 and 5, it can be understood that the size of the pixel electrode of the second embodiment is larger than the size of the pixel electrode of the first embodiment. In other words, the pixel electrode 132 of the first embodiment could be away from the data line as much as a fixed distance 'd,' but the pixel electrode 232 of the second embodiment may be formed to partially overlap the data line. The second embodiment of the present invention has an increased aperture ratio and the transflective liquid crystal display device improves productivity.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:
1. A transflective liquid crystal display device, comprising:
an upper array substrate comprising a gate line, an insulated data line that crosses the gate line, an organic passivation film pattern overlapped with the data line, and a pixel electrode overlapping the data line with the organic passivation film pattern therebetween;

a lower array substrate facing the upper array substrate with a liquid crystal layer therebetween and a dispersion film, which disperses an external light, formed of a photosensitive acryl organic material, a reflection pattern formed on the dispersion film and in a reflection area to expose the dispersion film in a transmission area, a color filter layer formed on the reflection pattern and the dispersion film, and a common electrode that covers the color filter layer; and a backlight unit that irradiates light to the lower array substrate, and wherein the organic passivation film pattern is formed in the reflection area to expose a gate insulating film in the transmission area, wherein a color filter well penetrating the color filter layer is formed in the reflection area of the color filter layer, and wherein the common electrode is connected to the reflection pattern through the color filter well.

2. The transflective liquid crystal display device according to claim 1, further comprising a thin film transistor formed at the crossing point of the gate line and the data line under the organic passivation film; and wherein the pixel electrode is connected to the thin film transistor through a contact hole which penetrates the organic passivation film pattern to expose the thin film transistor.

3. The transflective liquid crystal display device according to claim 1, wherein the organic passivation film pattern is formed of an organic insulating material selected from the group consisting of acrylic compound, Teflon, BCB, Cytop, or PFCB.

4. The transflective liquid crystal display device according to claim 1, wherein the reflection pattern formed in a surface of the dispersion film and an upper part of the dispersion film is formed in an embossing shape having a concave-convex portion.

5. The transflective liquid crystal display device according to claim 1, wherein a black matrix is formed between the color filter layer and the reflection pattern.

6. A fabricating method of a transflective liquid crystal display device, comprising the steps of:

providing an upper array substrate having a gate line, and an insulated data line that crosses the gate line;

forming a thin film transistor at the crossing point of the gate line and the data line;

forming an organic passivation film pattern to expose a gate insulating film in the transmission area and to overlap the data line and the thin film transistor in a reflection area;

forming a pixel electrode to overlap the data line with the organic passivation film pattern therebetween;

providing a lower array substrate that has a dispersion film, which is formed of a photosensitive acryl organic material, a reflection pattern, formed on the dispersion film in the reflection area to expose the dispersion film in a transmission area, a color filter layer formed on the reflection pattern and the dispersion film, and a common electrode that covers the color filter layer;

bonding the upper array substrate and the lower array substrate to face each other;

injecting a liquid crystal between the upper array substrate and the lower array substrate; and disposing a backlight unit for irradiating the lower array substrate, wherein a color filter well penetrating the color filter layer is formed in the reflection area of the color filter layer at the same time as the color filter layer, and wherein the common electrode is connected to the reflection pattern through the color filter well.

7. The fabricating method according to claim 6, wherein the step of providing the upper array substrate includes:

forming the gate line on an upper substrate;

forming the data line which is insulated from and crosses the gate line, and the thin film transistor at the crossing part of the gate line and the data line;

forming the organic passivation film pattern which covers the data line and the thin film transistor and includes the transmission hole to expose the gate insulating film formed over the upper substrate; and forming the pixel electrode to overlap the data line with the organic passivation film pattern therebetween.

8. The fabricating method according to claim 7, wherein the step of forming the organic passivation film pattern includes:

forming a contact hole that penetrates the organic passivation film pattern to expose the thin film transistor.

9. The fabricating method according to claim 7, wherein the organic passivation film pattern is formed of an organic insulating material selected from the group consisting of acrylic compound, Teflon, BCB, Cytop, or PFCB.

10. The fabricating method according to claim 6, wherein the step of providing the lower array substrate further includes:

forming the dispersion film on a lower substrate;

forming the reflection pattern in the reflection area to expose the dispersion film in the transmission area;

forming the color filter layer on the dispersion film and the reflection pattern; and forming the common electrode which covers the color filter layer.

11. The fabricating method according to claim 10, wherein the reflection pattern formed in a surface of the dispersion film and an upper part of the dispersion film is formed in an embossing shape having a concave-convex portion.

12. The fabricating method according to claim 10, further comprising the steps of:

forming a black matrix between the color filter layer and the reflection pattern.

* * * * *